United States Patent Office 3,020,776
Patented Feb. 13, 1962

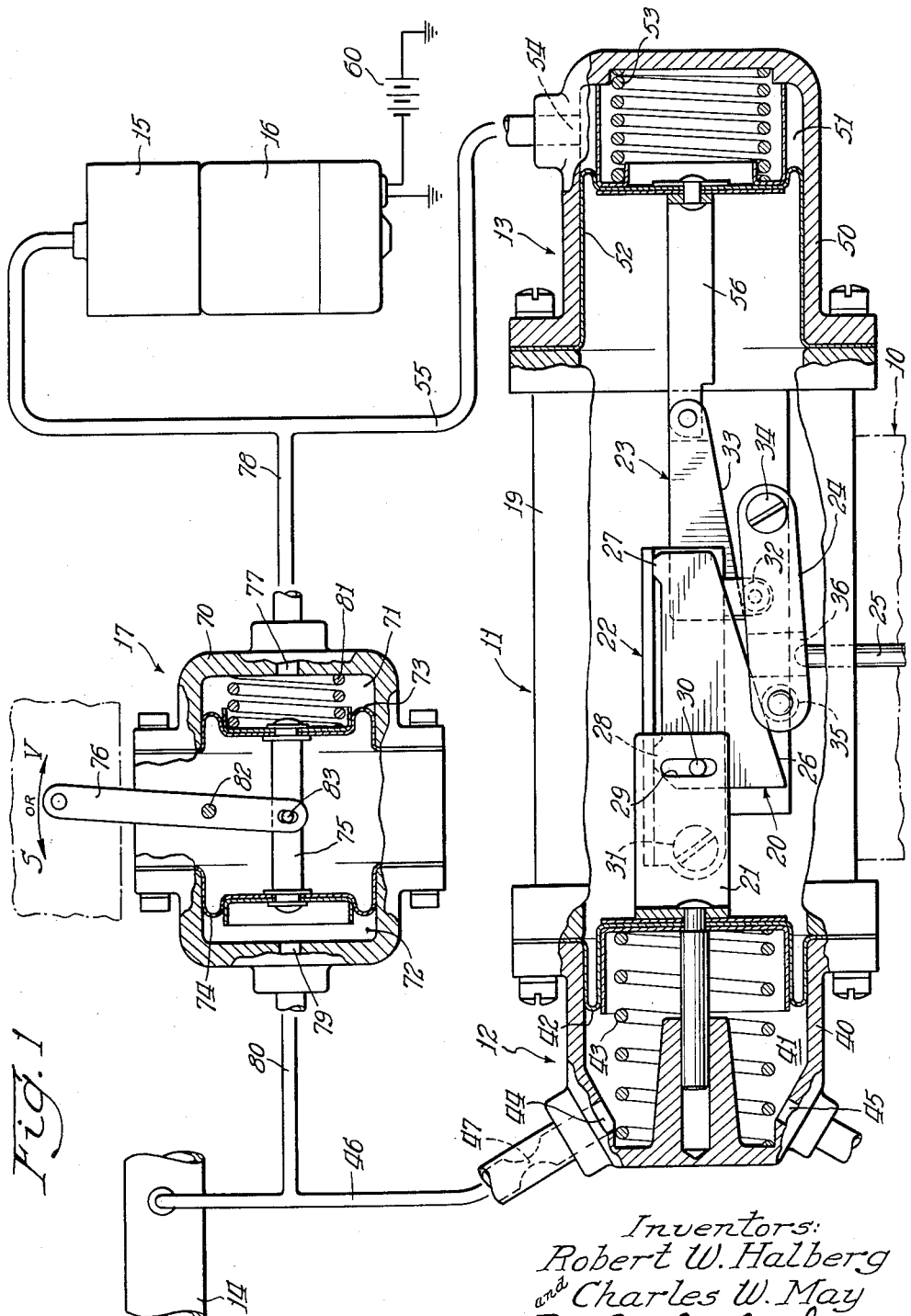

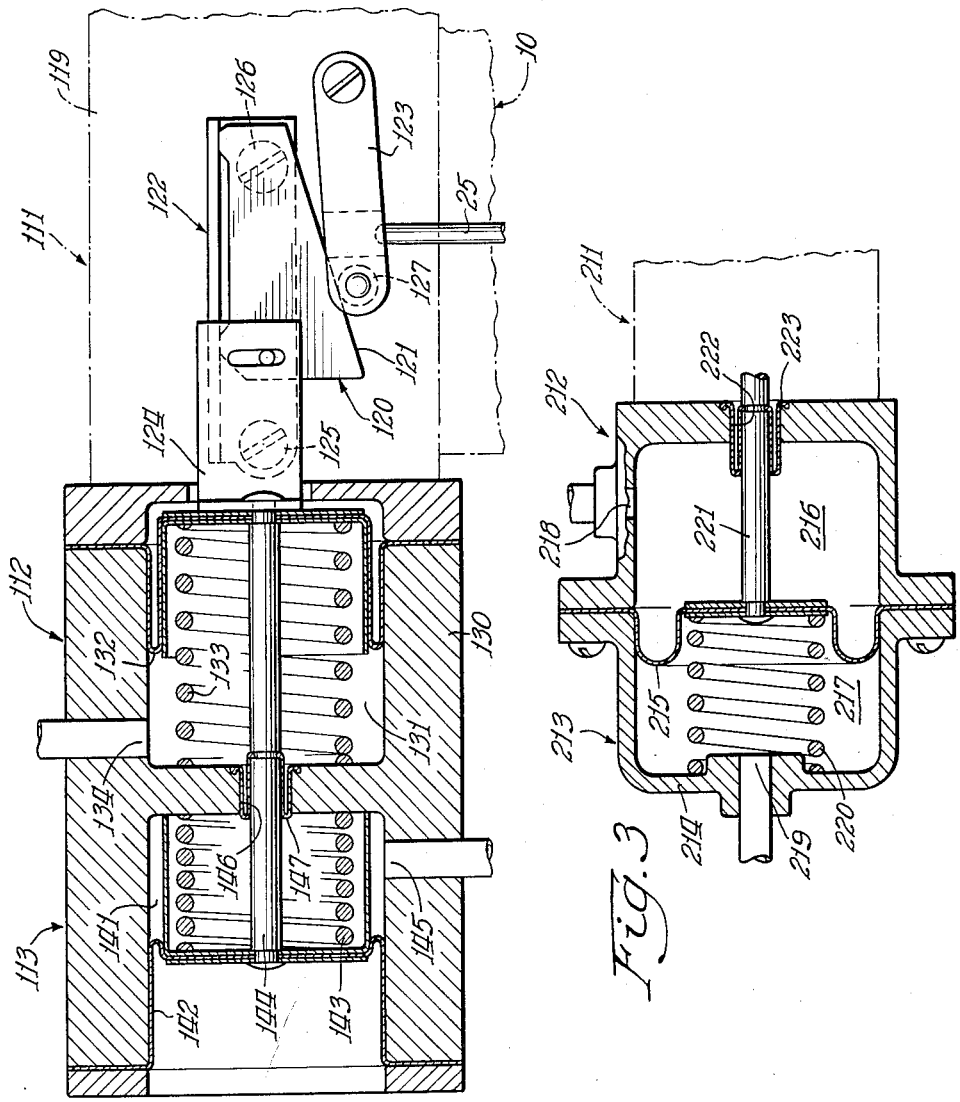

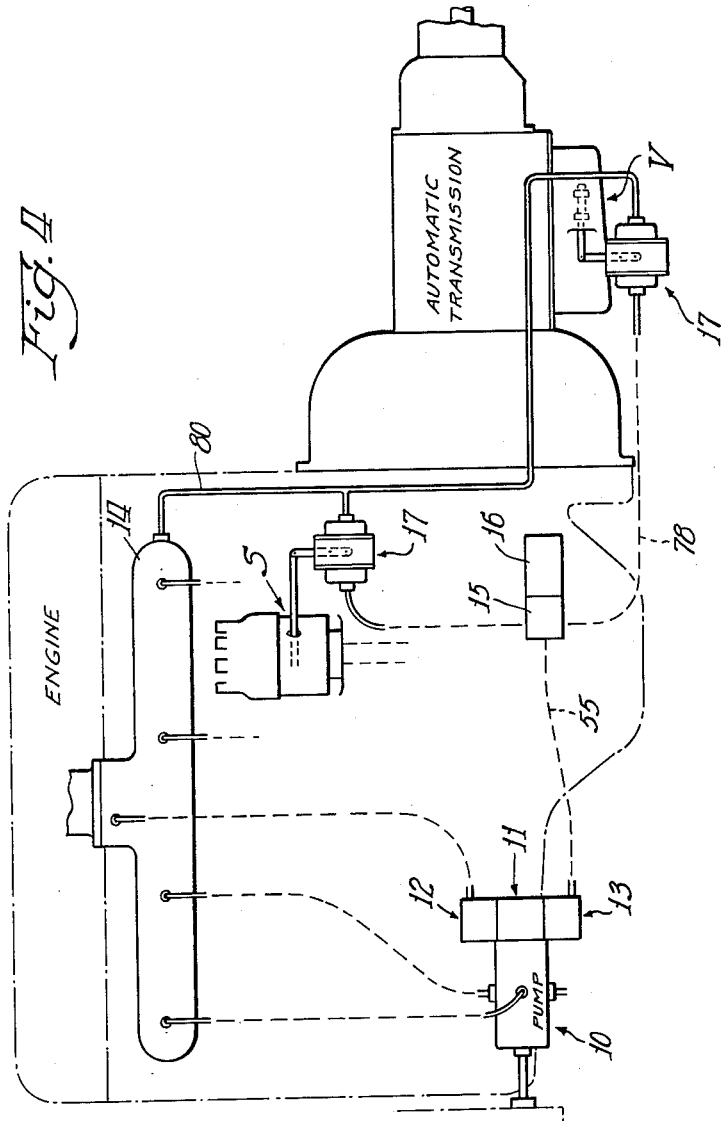

3,020,776
VACUUM REFERENCE CONTROL FOR
PRESSURE COMPENSATION
Charles W. May, Decatur, and Robert W. Halberg, Des Plaines, Ill., assignors to Borg-Warner Corporation, Chicago, Ill., a corporation of Illinois
Filed May 25, 1960, Ser. No. 31,655
10 Claims. (Cl. 74—472)

This invention relates to a control mechanism for a fuel injection pump particularly adapted to compensate for changes in atmospheric pressure.

In a conventional type metering system for a fuel injector, it is essential that some compensation be made for changes in ambient or atmospheric pressure as, for example, due to changes in altitude. Conventional means for correcting for changes in atmospheric pressure normally employ an auxiliary evacuated bellows for sensing such normally slow changes in pressure. The bellows by itself develops very little power; consequently, some sort of power amplifying means must be employed in addition to realize any useable power from the expansion or contraction of the bellows. Alternatively, the bellows must be of such a large size as to be economically unfeasible.

It is an object of the present invention to provide a control mechanism for a fuel injection pump for an internal combustion engine that is operated as a function of absolute manifold pressure and that is effective to compensate for changes in ambient or atmospheric pressure. The present invention accomplishes this result inherently without the use of a conventional pre-evacuated metallic bellows. Such a bellows when subjected to rapidly fluctuating pressures, as produced by the air-intake manifold, is prone to fatigue failure.

It is a more particular object to provide means for compensating for changes in atmospheric pressure by employing a small vacuum pump to establish a reference vacuum and utilizing a vacuum operated servomotor for compensating for fluctuations in manifold vacuum due to changes in atmospheric pressure.

It is a more particular object to provide a control mechanism for a fuel injection pump comprising a cam that is moved longitudinally for controlling the output of the pump, a manifold vacuum operated servomotor for moving the cam, a second vacuum operated servomotor for also moving the cam, and means including a vacuum pump for establishing a reference vacuum for operating said second servomotor for thereby compensating said first servomotor for changes in atmospheric pressure.

It is still another object to provide a control mechanism for a fuel injection pump including an independently operated vacuum pump for establishing a reference vacuum for correcting the control mechanism for changes in atmospheric pressure, and additional vacuum responsive means operable by said reference vacuum pump for controlling other functions of an internal combustion engine, such as advancing the ignition spark mechanism.

It is a further object to provide a reference vacuum for controlling the control mechanism of a fuel injection pump and for controlling the hydraulic pressure regulation system of an automatic transmission so as to thereby compensate for changes in engine power due to changes in atmospheric pressure.

The invention consists of the novel construction, arrangements, and devices to be hereinafter described and claimed for carrying out the above-stated objects and such other objects as will appear from the following description of a preferred form of the invention, illustrated with reference to the accompanying drawings, wherein:

FIG. 1 is a diagram of the improved control sytsem of the present invention showing some elements in cross section;

FIG. 2 is a modified version of a portion of the control system of FIG. 1;

FIG. 3 is an additional modification of the control mechanism of FIG. 1; and

FIG. 4 is a schematic view of an automotive vehicle engine together with an automatic transmission and a spark distribution mechanism.

Like characters of reference designate like parts in the several views.

Referring to FIG. 1, there is illustrated a schematic diagram partially in section, of a control system for a fuel injection pump 10. The control system includes a mechanical computer or integrating section 11, a manifold vacuum responsive servomotor 12, a reference vacuum responsive servomotor 13, an air-intake manifold 14 for the internal combustion engine with which the pump 10 is being used; a vacuum pump 15 for operating the servomotor 13, an electric motor 16 for operating the vacuum pump 15, and an accessory drive unit 17 that is also operated by the vacuum pump 15.

The computer section 11 comprises a casing 19, a two-dimensional cam 20, a connecting shaft 21 for moving the cam 20, a guide arm 22 for supporting the cam 20, a second cam 23 adapted to move the guide arm 22, a cam follower arm 24, and an output control pin or shaft 25. The cam 20 is formed with a cam surface 26 and two sliding contact points 27 and 28 which abut against the guide arm 22. The cam 20 is adapted to be moved longitudinally along the guide arm 22 by means of the connecting shaft 21. The shaft 21 is formed with a slot 29 which receives a pin 30 carried by the cam 20. The guide arm 22 is pivotally mounted on a fixed pin 31 and is adapted to be turned about the pin 31 by means of a cam follower 32 which is in contact with a cam surface 33 on the second cam 23.

The cam follower arm 24 is pivotally mounted on a fixed pin 34 and carries a roller or cam follower 35 which contacts the cam surface 26 of the sliding cam 20. One end of the output shaft 25 is retained in a socket 36 mounted on the follower arm 24. The output shaft 25 is adapted to be moved longitudinally as the cam follower 35 moves along the cam surface 26 for controlling the output of the pump 10.

The manifold vacuum responsive servomotor 12 comprises a casing 40 attached to the casing 19 and formed with an internal cavity 41, a diaphragm 42, and spring 43. The diaphragm 42 is attached to the connecting shaft 21 for moving the cam 20. The casing 40 is formed with inlet ports 44 and 45 which open into the cavity 41. Port 44 is connected to the air-intake manifold 14 for the vehicle engine by means of a conduit 46. The conduit 46 is formed with a restriction 47 which limits the flow of air through the conduit 46. The spring 43 normally tends to force the diaphragm 42 and connecting shaft 21 to the right, but when air is removed from the cavity 41 by reduced pressure within the air-intake manifold 14, atmospheric pressure acting on the right face of diaphragm 42 forces the control shaft 21 and cam 20 to the left against the action of spring 43. The diaphragm 42 and cam 20, therefore, are moved as a function of atmospheric pressure and pressure existing in the air-intake manifold 14.

The port 45 is connected to an air-bleed mechanism (not shown) for modifying the effect of manifold vacuum acting on the diaphragm 42 and thereby modifying the output of the fuel injection pump 10 for certain engine operating conditions. The restriction 47 serves to limit the flow of air through conduit 46 and prevents manifold vacuum from completely overruling the effect of air bled through port 45.

The reference vacuum servomotor 13 comprises a casing 50 formed with an internal cavity 51, a diaphragm 52, and a spring 53. The casing 50 is attached to the casing 19 and is formed with an inlet port 54 opening into the cavity 51 and connected to the vacuum pump 15 by means of a conduit 55. The diaphragm 52 is connected to the cam 23 by means of a connecting shaft 56 and is adapted to move the cam 23 and guide arm 22.

The spring 53 normally tends to force the cam 23 to the left, as shown, but when air is evacuated from the cavity 51 through conduit 55 by the pump 15, atmospheric pressure acting on the left face of the diaphragm 52 is effective to move the diaphragm 52 and cam 23 to the right against the action of the spring 53. The diaphragm 52 reaches an equilibrium position when the force of the spring 53 and residual pressure within the cavity 51 is balanced by atmospheric pressure acting against the area of the diaphragm 52.

The pump 15 is shown as driven by means of an electric motor 16 which is energized by a vehicle battery 60, but may be driven by any suitable drive means. It is desirable to drive the vacuum pump 15 at a fairly constant speed that does not vary with engine speed. The vacuum pump 15 may be of any suitable type capable of establishing and maintaining a predetermined low pressure.

It is contemplated that the reference vacuum established by pump 15 may also be used as a reference for controlling other elements of the vehicle. In particular, this reference vacuum can be used to advantage by a suitable mechanism for advancing the spark mechanism S of the electrical distributing system.

The accessory drive unit 17 may be utilized for this purpose and comprises a casing 70 formed with internal cavities 71 and 72, diaphragms 73 and 74, a shaft 75 interconnecting the diaphragms 73 and 74, and an output lever 76.

The casing 70 is formed with an inlet port 77 opening into the cavity 71 and connected by means of a conduit 78 to the vacuum pump 15. The casing 70 is also formed with a port 79 opening into the cavity 72 and connected by means of a conduit 80 to the air-intake manifold 14. A spring 81 is disposed under compression within the cavity 71 and acts against the diaphragm 73 tending to force the shaft 75 to the left. When the cavity 71 is evacuated by the pump 15, atmospheric pressure acting against the diaphragm 73 tends to move the shaft 75 to the right against the action of the spring 81 and residual pressure within 71. When the cavity 72 is evacuated by the air-intake manifold 14, atmospheric pressure acting against the right face of diaphragm 74 tends to move the shaft 75 to the left.

The output lever 76 is pivoted on a pin 82 and is connected to the shaft 75 by means of a pin 83. The output lever 76, connected to S, is moved angularly about the pin 82 as the shaft 75 is moved under the combined influence of manifold vacuum, the reference vacuum, and the action of spring 81.

In operation, when the vehicle engine is running, the pressure within the air-intake manifold 14 is less than atmospheric pressure and, depending upon throttle valve position, this pressure may be in the range of from 0 to 15 p.s.i. Any pressure less than atmospheric pressure will be effective to cause the diaphragm 42 and connecting shaft 21 to be moved to the left, as shown, thereby moving the control cam 20. The cam follower 35 effectively rolls downhill on the cam surface 26, the connecting pin 25 moves upwardly, as shown, and the output of the pump 10 is reduced. For a particular pressure existing within the air-intake manifold 14, the cam 20 reaches an equilibrium position when the force differential due to atmospheric pressure and manifold pressure acting on the diaphragm 42 is balanced by the spring 43. The pressure within the air-intake manifold 14 varies directly as a function of throttle opening and engine speed, and the cam 20, therefore, is moved effectively as a function of throttle position and engine speed.

In utilizing a control of this type, it is necessary to compensate for changes in atmospheric pressure, particularly due to changes in altitude, and thereby compensate for changes in engine fuel requirement. For this purpose, the reference vacuum servomotor 13 and cam 23 are effective to modify the position of the cam 20 for correspondingly varying the output of the pump 10. When the vacuum pump 15 is operating, air is removed from the cavity 51 and the diaphragm 52 moves to the right against the action of spring 53. An equilibrium position is reached when the force due to atmospheric pressure acting on the diaphragm 52 is balanced by the spring 53 and residual pressure within cavity 51. This equilibrium position determines a position for the cam 23. The cam follower 32 carried by the guide arm 22 causes the guide arm 22 and cam 20 to assume a corresponding angular position.

As atmospheric pressure is reduced, as for example, due to an increase in altitude, the force due to atmospheric pressure acting on the diaphragm 42 is reduced and the spring 43 tends to force the control shaft 21 and cam 20 to the right. Movement of the cam 20 to the right causes the control arm 24 and shaft 25 to move downwardly, thereby tending to increase the output of the pump 10. The reduced atmospheric pressure, therefore, will tend to have an effect on the engine equivalent to opening the throttle valve which, in turn, tends to increase the output of the pump 10.

The reference vacuum servomotor 13, however, is also responsive to changes in atmospheric pressure and tends to reduce the output of the pump 10 so that the correct fuel-to-air ratio is maintained. Under the conditions assumed, the diaphragm 52 under the action of the spring 53 is moved to the left. The diaphragm 52 moves the cam 23 to the left and the cam follower 32 effectively rolls downhill along the cam surface 33. The guide arm 22 and cam 20 tend to move counterclockwise about the pin 31 and the cam follower arm 24 and control shaft 25 move upwardly, as shown. Movement of the control shaft 25 upwardly effectively reduces the output of the pump 10 so that the correct fuel-to-air ratio is maintained at the reduced atmospheric pressure.

The principles described above for controlling a fuel injection pump may also be used for advancing or retarding the spark mechanism of the engine and for controlling the operation of an automatic transmission of an automotive vehicle. The conventional automatic transmission normally employs planetary gearing and a plurality of fluid pressure actuated servomotors for completing the various power trains through the transmission. A fluid pump supplies hydraulic pressure which is regulated and distributed to the various servomotors by a plurality of valves for causing upshifts and downshifts according to certain operating conditions.

As an example, upshifts and downshifts normally occur as a function of throttle position and load on the engine. At higher altitudes where the atmospheric pressure is substantially less, the power developed by the engine is less, and the control system for the transmission under these conditions might tend to cause shifts in gear ratio at speeds other than normal. The accessory drive unit 17 could be adapted for this purpose to supply a bias force to a control valve V of the hydraulic control system for the transmission so as to effectively compensate for changes in engine operation due to changes in atmospheric pressure.

Referring to FIG. 2, there is illustrated a modification of the control system of FIG. 1, particularly of the computer section and servomotors for operating the computer section. In the modification of FIG. 2, there is illustrated a computer or integrator section 111, a manifold vacuum responsive servomotor 112, and a reference vacuum operated servomotor 113. The computer 111 comprises a casing 119, a cam 120 formed with a cam surface 121, a guide arm 122 for the cam 120, a cam follower arm 123, and a connecting shaft 124. The guide arm 122 is fixedly attached to the casing 119 by machine screws 125 and 126. The cam follower arm 123 carries a roller or cam follower 127 in contact with the cam surface 121 which is moved as the cam 120 moves so as to control the output of the pump 10, as previously described.

The manifold vacuum operated servomotor 112 comprises a casing 130 formed with an internal cavity 131, a diaphragm 132 mounted within the casing 130, and a spring 133. The casing 130 is also formed with a port 134 opening into the cavity 131 and connected to the air-intake manifold 14. The connecting shaft 124 is attached to the diaphragm 132 and functions to move the cam 120 as the diaphragm 132 is moved under the combined forces of atmospheric pressure, manifold pressure, and spring 133.

The reference vacuum servomotor 113 comprises the casing 130 formed with an internal cavity 141, a diaphragm 142, a spring 143, and a connecting shaft 144. The casing is formed with an inlet port 145 opening into the cavity 141 and through which air is evacuated by means of the vacuum pump 15. The diaphragm 142 is directly interconnected with the diaphragm 132 by means of the connecting shaft 144. The casing 130 is also formed with an opening 146 through which the shaft 144 slidably extends, and a seal 147 is provided to prevent leakage of air between cavities 131 and 141.

In operation, the modified controls of FIG. 2 function as follows:

Manifold vacuum is effective to withdraw air from the cavity 131 and atmospheric pressure tends to move the diaphragm 132 and connecting shaft 144 to the left against the action of the spring 133. The diaphragm 132 functions to move the cam 120 for controlling the output of pump 10 as a function of manifold vacuum, as previously described.

A bias force on the diaphragm 132 is provided by the reference vacuum servomotor 113 as follows:

As air is withdrawn from cavity 141 by the vacuum pump 15, atmospheric pressure tends to cause the diaphragm 142 to move to the right against the action of the spring 143. This force and motion is transmitted through the connecting shaft 144 to the diaphragm 132 and connecting shaft 124 for modifying the position of the cam 120. The position of the cam 120 for controlling the output of the pump 10, therefore, is controlled by the combined efforts of the manifold vacuum servomotor 112 and the reference vacuum servomotor 113.

In the embodiment of FIG. 2, it is important that the diaphragms 132 and 142 be of the same diameter or area. As ambient or atmospheric pressure is reduced, the force acting on the diaphragm 132 is reduced and the spring 133 tends to move the connecting shaft 124 and cam 120 to the right. The force due to atmospheric pressure acting against the diaphragm 142 is also reduced, however, and the spring 143 tends to move the diaphragm 142 and connecting shaft 144 to the left. The positioning of the cam 120 is not affected and the correct fuel-to-air ratio is maintained notwithstanding the change in atmospheric pressure.

Referring to FIG. 3, there is illustrated still another modification of the controls of FIG. 1 in which the manifold vacuum operated servomotor and reference vacuum servomotor have been combined and employ a common diaphragm. The controls of FIG. 3 comprise a computer mechanism 211, a manifold vacuum operated servomotor 212, and a reference vacuum servomotor 213. The servomotors 212 and 213 are combined into a common casing 214 and employ a common diaphragm 215. The casing 214 is formed with internal cavities 216 and 217 separated by the diaphragm 215. The casing 214 is formed with an inlet port 218 opening into the cavity 216 and connected to the air-intake manifold 14, and is also formed with a port 219 opening into the cavity 217 and connected to the reference vacuum pump 15. A spring 220 is disposed under compression within the cavity 217 and acts against diaphragm 215 tending to force it to the right, as shown. A connecting shaft 221 is attached to the diaphragm 215 and extends through an opening 222 in the wall of the casing 214. A seal 223 is provided around the shaft 221 to prevent leakage of air into the cavity 216. The seal 223 may be of the "rolling-type" which permits freedom of motion of the shaft 221 with a minimum of friction. The shaft 221 is connected to move the control cam 120 for varying the output of the pump 10, as previously described. For this embodiment, the computer section 211 may be identical to that shown in FIG. 2.

The controls of the embodiment of FIG. 3 function to control the output of the pump 10 in accordance with changes in manifold vacuum and atmospheric pressure, as previously described. The embodiment of FIG. 3, however, employs fewer parts and is simpler in construction than the earlier embodiments. Since a common diaphragm 215 is used for both servomotors, any change in force acting on the diaphragm 215 due to changes in atmospheric pressure are compensated for except for the cross-sectional area of the shaft 221. The pump 10, therefore, is controlled directly as a function of absolute manifold pressure.

There has been provided by this invention, an improved control mechanism particularly adapted for controlling the output of a fuel injection pump as a function of change in atmospheric pressure. The principles described for controlling a fuel injection system are equally applicable for controlling the advance and retard of the ignition spark mechanism and may also be applied for controlling the operation of an automatic transmission.

The present invention utilizes a flexible diaphragm that is responsive to reference vacuum for compensating for changes in atmospheric pressure. The vacuum pump is effective to maintain as stable a reference level as would normally be obtained by a sealed bellows and is effective to make up for any leakage losses.

It is to be understood that the invention is not to be limited to the specific constructions and arrangements shown and described, except only insofar as the claims may be so limited, as it will be understood to those skilled in the art that changes may be made without departing from the principles of the invention.

We claim:

1. In a control mechanism for a fuel injection pump for an internal combustion engine having an air-intake manifold, the combination of a movable cam for controlling the output of the pump, a manifold vacuum operated servomotor for moving said cam, a reference vacuum operated servomotor for further moving said cam for compensating for changes in ambient pressure, and a vacuum pump for operating said reference vacuum servomotor.

2. In a control mechanism for a fuel injection pump for an internal combustion engine having an air-intake manifold, the combination of a cam that is movable in two dimensions for controlling the output of the pump, a manifold vacuum responsive servomotor for moving said cam in said one dimension for controlling the output of the pump with respect to manifold pressure; a second vacuum responsive servomotor for moving said cam in a second dimension for compensating the output of said pump with changes in ambient pressure, and a vacuum pump for establishing a reference vacuum for operating said second servomotor.

3. In a control mechanism for a fuel injection pump for an internal combustion engine having an air-intake manifold, the combination of a movable cam adapted to control the output of the pump, a manifold vacuum operated servomotor including a flexible diaphragm responsive to manifold vacuum for moving said cam, a second vacuum servomotor including a flexible diaphragm also adapted to move said cam, means for interconnecting said diaphragms, and a vacuum pump for establishing a reference vacuum for operating said second servomotor.

4. In a control mechanism for an internal combustion engine having an air-intake manifold, the combination of a first servomotor having a flexible diaphragm and connected to said air-intake manifold so that said diaphragm moves as a function of manifold pressure, a second servomotor including a flexible diaphragm, a vacuum pump for establishing a reference vacuum and connected so as to move said second diaphragm in response to said reference vacuum, a connecting shaft interconnecting said two diaphragms, and an output shaft adapted to be moved under the combined influence of said two servomotors whereby the motion of said output shaft is controlled as a function of absolute manifold pressure.

5. In a control mechanism for an automotive vehicle having an engine with an air-intake manifold and having an automatic transmission with a control valve for controlling the transmission, the combination of an output shaft for applying a bias force to the control valve, a manifold vacuum operated servomotor connected to move said shaft, a second vacuum responsive servomotor interconnected with said first servomotor and also adapted to move said shaft, and a reference vacuum pump for operating said second servomotor whereby the automatic transmission is controlled as a function of absolute manifold pressure.

6. In a control mechanism for an internal combustion engine having an air-intake manifold and a spark distribution mechanism, the combination of a first manifold vacuum responsive servomotor for adjusting the spark mechanism as a function of manifold pressure, a second vacuum responsive servomotor interconnected with said first servomotor and adapted to further adjust said spark mechanism, and a vacuum pump for establishing a reference vacuum for operating said second servomotor whereby said spark mechanism is controlled as a function of absolute manifold pressure.

7. In a control mechanism for an internal combustion engine having an air-intake manifold, the combination of a casing formed with two internal cavities, a flexible sealing diaphragm separating said two cavities, an output shaft connected to and adapted to be moved by said diaphragm, means for connecting one of said cavities with said air-intake manifold so that said diaphragm can be moved as a function of manifold pressure, a reference vacuum pump, means for connecting said vacuum pump to the other of said cavities so that said diaphragm can be moved under the influence of said reference vacuum, and spring means disposed within one of said cavities and also adapted to move said diaphragm whereby said output shaft moves as a function of absolute manifold pressure.

8. In a control mechanism for an automotive vehicle having an internal combustion engine with an air-intake manifold, an ignition spark adjusting mechanism for the engine and a fuel injection pump for supplying fuel to the engine, the combination of means responsive to manifold vacuum for controlling the output of said pump and for adjusting the spark mechanism, a vacuum pump for supplying a reference vacuum, and means responsive to said reference vacuum for controlling the output of said fuel injection pump and also for adjusting said spark mechanism.

9. In a control mechanism for an automotive vehicle having an internal combustion engine with an air-intake manifold, a fuel injection pump for supplying fuel to the engine and an automatic transmission with a control valve, the combination of means responsive to manifold vacuum for controlling the output of said pump and for controlling said control valve, a vacuum pump for establishing the reference vacuum, and means responsive to said reference vacuum for controlling the output of said fuel injection pump and for also controlling said control valve, whereby said fuel injection pump and said automatic transmission are operated as a function of absolute manifold pressure.

10. In an automotive vehicle having an automatic transmission with a control valve, an internal combustion engine with an air-intake manifold and an ignition spark adjusting mechanism, and a fuel injection pump for supplying fuel to the engine, the combination of means responsive to manifold vacuum for simultaneously controlling the output of said fuel injection pump and the spark adjusting mechanism and the control valve, a vacuum pump for establishing a reference vacuum, means responsive to said reference vacuum for simultaneously controlling the output of said fuel injection pump and adjusting said spark mechanism and adjusting said control valve, whereby the output of said fuel injection pump and the spark adjusting mechanism and the control valve of the transmission are all controlled as a function of absolute manifold pressure.

References Cited in the file of this patent

UNITED STATES PATENTS

| | | |
|---|---|---|
| Re. 21,828 | Fleischel | June 17, 1941 |
| 2,209,321 | Colell | July 30, 1940 |
| 2,214,766 | Hurst | Sept. 17, 1940 |
| 2,233,035 | Schweizel et al. | Feb. 25, 1941 |
| 2,771,788 | Frick et al. | Nov. 27, 1956 |
| 2,837,932 | Roller | June 10, 1958 |
| 2,922,314 | Johnson et al. | Jan. 26, 1960 |